US011258326B2

(12) United States Patent
Guntermann et al.

(10) Patent No.: US 11,258,326 B2
(45) Date of Patent: Feb. 22, 2022

(54) APPARATUS FOR DRIVING A COMPRESSOR AND METHOD FOR ASSEMBLING THE APPARATUS

(71) Applicant: Hanon Systems, Daejeon (KR)

(72) Inventors: Bernd Guntermann, Lennestadt (DE); David Walisko, Hürth (DE); Stephan Heinrichs, Hürtgenwald (DE)

(73) Assignee: Hanon Systems, Daejeon (KR)

( * ) Notice: Subject to any disclaimer, the term of this patent is extended or adjusted under 35 U.S.C. 154(b) by 244 days.

(21) Appl. No.: 16/442,027

(22) Filed: Jun. 14, 2019

(65) Prior Publication Data

US 2019/0393750 A1    Dec. 26, 2019

(30) Foreign Application Priority Data

Jun. 20, 2018 (DE) .......................... 102018114826.7
Mar. 25, 2019 (DE) .......................... 102019107511.4

(51) Int. Cl.
*H02K 3/46* (2006.01)
*H02K 3/32* (2006.01)
(Continued)

(52) U.S. Cl.
CPC ........... *H02K 3/46* (2013.01); *B60H 1/00428* (2013.01); *H02K 3/28* (2013.01); *H02K 3/32* (2013.01); *H02K 5/04* (2013.01)

(58) Field of Classification Search
CPC .. H02K 3/46; H02K 5/04; H02K 3/32; H02K 3/28; H02K 15/12; H02K 5/225;
(Continued)

(56) References Cited

U.S. PATENT DOCUMENTS

| 2011/0115317 | A1* | 5/2011 | Stark | H02K 3/522 |
| | | | | 310/71 |
| 2014/0363320 | A1* | 12/2014 | Hayakawa | H02K 3/46 |
| | | | | 417/420 |
| 2018/0183290 | A1* | 6/2018 | Wust | H02K 3/522 |

FOREIGN PATENT DOCUMENTS

JP    2014128049 A  *  7/2014
JP    2014128049 A     7/2014
(Continued)

OTHER PUBLICATIONS

Machine Translation, Hirota, JP-2014128049-A, Jul. 2014. (Year: 2014).*

*Primary Examiner* — Thomas Truong
(74) *Attorney, Agent, or Firm* — Norton Rose Fulbright US LLP; James R. Crawford

(57) ABSTRACT

A device, in particular to an electric motor, for driving a compressor of a gaseous fluid. The device comprises a rotor and a stator disposed such that they extend along a common longitudinal axis. The stator comprises connection leads developed as segments of conductor wires of coils. In a region of at least one end side, oriented in an axial direction, of the stator a cover element is disposed which is developed in the form of an axially oriented hollow cylinder with an inner surface and an outer surface. The cover element herein is with the inner surface in contact on an insulation element disposed on the stator and comprising a cylindrical wall. Between an outer side of the wall of insulation element and the inner surface of the cover element are disposed at least segments of the connection leads of the conductor wires.

23 Claims, 2 Drawing Sheets

(51) Int. Cl.
  *B60H 1/00* (2006.01)
  *H02K 5/04* (2006.01)
  *H02K 3/28* (2006.01)

(58) Field of Classification Search
  CPC ...... H02K 2203/06; H02K 3/522; H02K 3/38;
       H02K 5/08; H02K 15/00; B60H 1/00428;
       F04B 35/04; F04B 17/03; F25B 31/026
  See application file for complete search history.

(56) References Cited

FOREIGN PATENT DOCUMENTS

| | | | |
|---|---|---|---|
| JP | 2014138453 | A | 7/2014 |
| JP | 2016192880 | A | 11/2016 |
| KR | 20110040576 | A | 4/2011 |
| KR | 20170071309 | A | 6/2017 |
| KR | 20180023166 | A | 3/2018 |

* cited by examiner

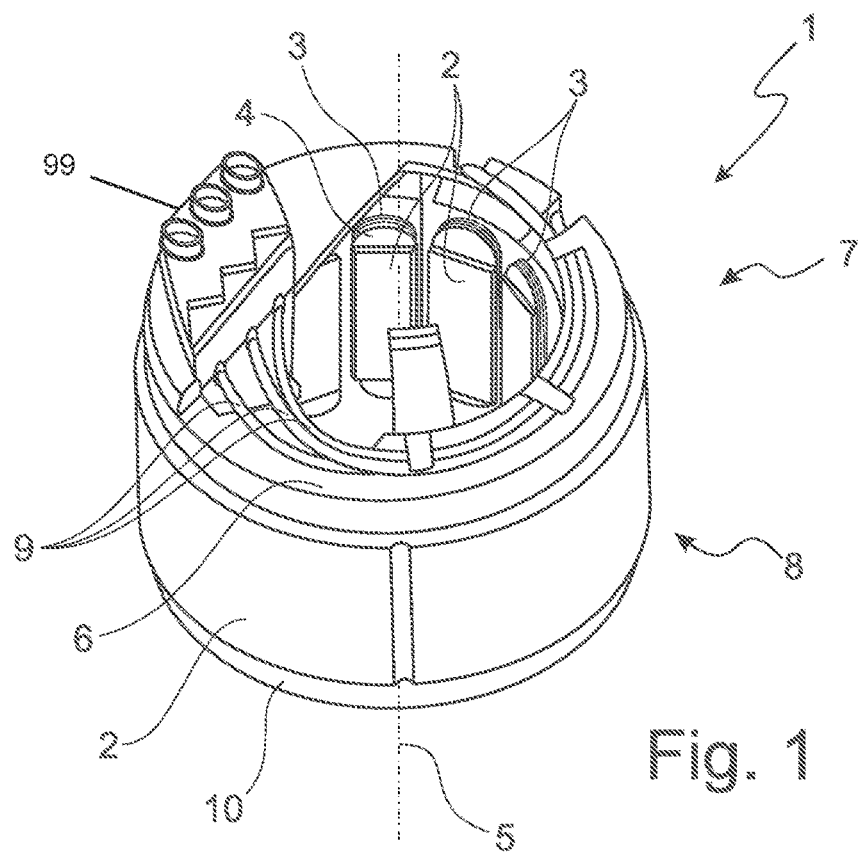
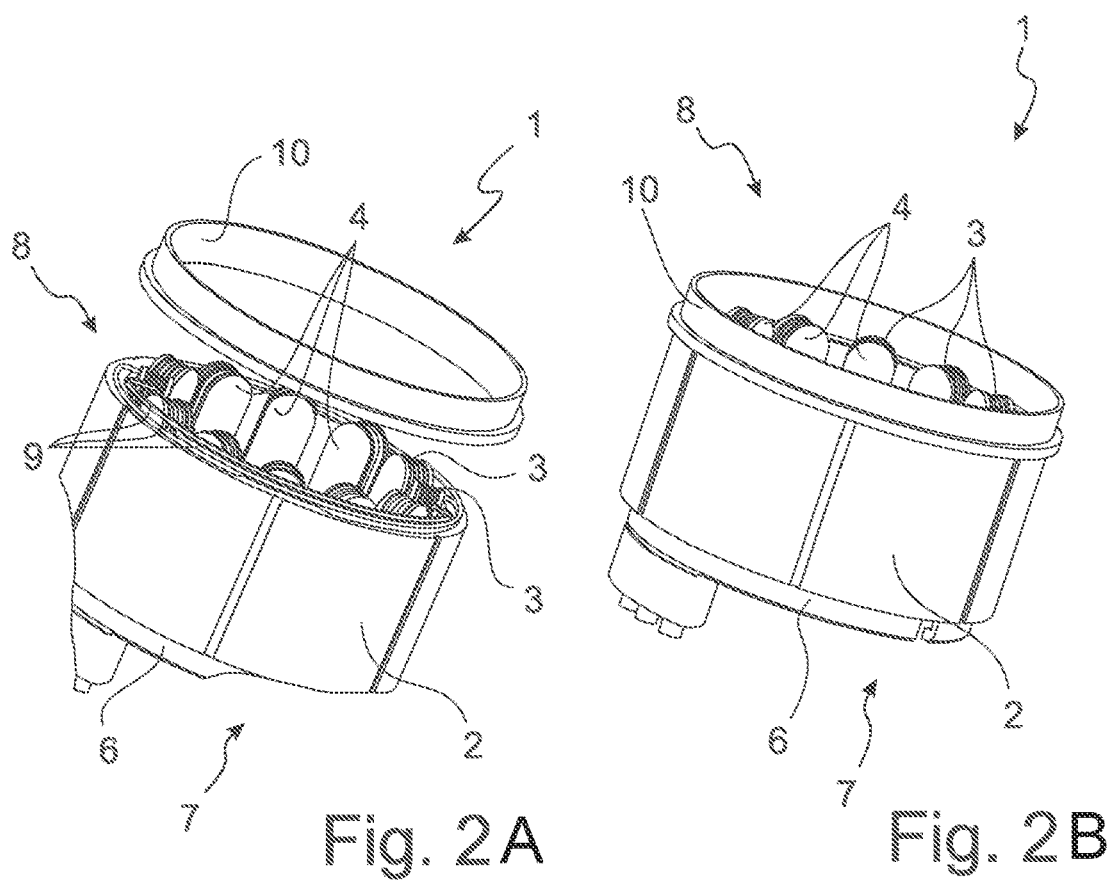

APPARATUS FOR DRIVING A COMPRESSOR AND METHOD FOR ASSEMBLING THE APPARATUS

This application claims priority from German Patent Application Nos. 102018114826.7 filed on Jun. 20, 2018 and 102019107511.4 filed on Mar. 25, 2019. The entire contents of these applications are incorporated herein by reference in their entirety.

FIELD OF THE INVENTION

The invention relates to a device, in particular an electric motor, for driving a compressor for the compression of a gaseous fluid, specifically a refrigerant. The compressor can be employed in the refrigerant circuit of a climate control system of a motor vehicle. The device comprises a rotor and a stator disposed along a common longitudinal axis. The stator comprises connection leads developed as segments of coil conductor wires.

BACKGROUND OF THE INVENTION

Compressors known in prior art for mobile applications, in particular for climate control systems of motor vehicles, for the conveyance of refrigerant through a refrigerant circuit, also termed refrigerant compressors, are often, independently of the refrigerant, developed as piston compressors with variable stroke displacement or as scroll compressors. The compressors herein are driven either by a belt pulley or electrically.

Apart from the electric motor for driving the particular compressor mechanism, an electrically driven compressor comprises an inverter for driving the electric motor. The inverter serves for converting direct current of a motor vehicle battery into alternating current that is supplied to the electric motor across electrical connections.

Conventional electric motors of electrically driven compressors are implemented with an annular stator core with coils disposed thereon and a rotor, wherein the rotor is disposed within the stator core. Rotor and stator are oriented along a common axis of symmetry or rotational axis of the rotor and are disposed such that they are encompassed by a housing with additional elements, such as sealings. In order to reduce, for one, the installation space within the motor vehicle and, for another, to fix the stator in position in the housing, the clearances between components of the electric motor, in particular those between the stator and the housing, are minimal.

The inverter comprises plug connections for plug connectors developed as separate components and pins for the electrical connection with connections of the electric motor, which, in turn, are connected with connection leads of conductor wires of the stator coils. The connection leads are guided on end sides of the stator core and are herein most often not covered by a stator insulation with respect to the housing of the motor. Moreover, the distance to components of the housing is often minimal.

In order to ensure an electric connection and simultaneously a high insulation resistance, for example between the connection leads of the conductor wires, the connection leads, or the conductor wires, also termed phase conductors, must be electrically insulated with respect to one another and other electrically conducting components of the stator as well as of the motor housing. At least regions of the connection leads of the individual phases of the electric motor, as segments of conductor wires developed in particular of lacquer-coated copper wire of the coils, are preferably insulated by synthetic material coating.

In addition, depending on the level of voltage, it is necessary to ensure adequate insulation distances between electrically conductive components, for example to avoid short circuits due to marginal creepage paths and air gaps. Based on the fabrication process and the insulation resistance, the insulation may also comprise markedly lowering imperfections or porosities, in particular pinholes, such that the risk of an electric flashover, in particular to components of the housing, increases. Depending on the quality of the lacquered copper wire, a certain maximal number of imperfections per unit length is permitted. If two of the copper wires with one imperfection each are disposed next to one another and the imperfections are in positions directly opposite or at least close to each other, the risk of an electric flashover between the copper wires is extremely high.

In prior art electric motors of electrically driven compressors to attain the necessary insulation distances, or insulation paths, either sufficiently great spacings are provided between the connection leads of the conductor wires and further electrically conductive components of the compressor or the regions of the connection leads of the conductor wires that are spaced too closely to other electrically conductive components are completely encapsulated. Depending on the voltage level, with the encapsulation of the connection leads, lesser spacing is also permissible between the connection leads of the conductor wires and further electrically conductive components of the compressor in comparison to nonencapsulated connection lead.

Using a motor with nonencapsulated connection leads demands large installation space for the motor, and consequently also for the electrically driven compressor, while in the case of a motor with encapsulated connection leads the additional step of encapsulation within the fabrication process with the added curing time for the potting compound is necessary.

OBJECTS OF THE INVENTION

The problem addressed by the invention comprises providing and improving a device, in particular an electric motor, for driving an electrically driven compressor of a gaseous fluid. Herein, in particular the conductor wires, or the connection leads of the conductor wires, are to be electrically insulated with respect to one another and to the surrounding electrically conducting components. The device is to be simple, and therewith time-savingly, of assembly as well as comprise the least possible number of individual components and structural parts as well as be constructionally simple to realize in order to minimize, for example, the weight and the space requirement as well as the cost of production.

SUMMARY OF THE INVENTION

The problem is resolved through the subject matters with the characteristics of the invention described herein.

The problem is resolved through a device, in particular an electric motor, according to the invention for driving a compressor of a gaseous fluid. The device comprises a rotor and a stationary stator extending along a common longitudinal axis. The stator comprises connection leads developed as segments of conductor wires of coils and is advantageously positioned such that it encompasses the rotor in the radial direction on an outer side of the rotor.

In the proximity of the coils the conductor wires are advantageously implemented of lacquer-coated and wound copper wire, wherein non-wound ends of the conductor wires are brought out of the particular winding as connection leads and magnetically inactive segments of the conductor wires. A first portion of the connection leads which can serve, for example, as connection leads for joining and connecting coils of same phase, are, similar to the conductor wires, in the proximity of the coils only developed with lacquer insulation, while a second portion of the connection leads, which are configured, for example, for the electric connection with connections of the electric motor, are preferably additionally insulated with a sheathing of synthetic material.

According to the concept of the invention, in a region of at least one end side, oriented in an axial direction, of the stator a cover element is disposed which has the form of an axially oriented hollow cylinder with an inner surface and an outer surface. The cover element herein is in contact with its inner surface on an insulation element that has a cylindrical wall and is disposed on a stator. Between an outer side of the wall of the insulation element and the inner surface of the cover element are disposed at least segments of the connection leads, in particular connection leads of the coils, of the conductor wires.

By axial direction is herein to be understood the direction of the longitudinal axis of the stator, which also corresponds to the longitudinal axis and the rotational axis of the rotor. An end side oriented in the axial direction is disposed in a plane oriented perpendicularly to the longitudinal axis.

The cover element advantageously has the form of a hollow circular cylinder and is preferably implemented as a closed annulus.

According to a further development of the invention, the insulation element is disposed such that it is in contact internally in a radial direction on an outer wall of a stator core. The cylindrical wall of the insulation is herein developed as a region projecting from the stator core in the direction of the longitudinal axis. The insulation element can be fixedly connected with the stator core.

The wall of the insulation element has preferably the form of a hollow cylinder, in particular of a hollow circular cylinder.

The cover element is advantageously fully in contact on the outer side of the cylindrical wall of the insulation element. Herein a diameter of the inner surface of the cover element can correspond to the diameter, specifically to the outer diameter, of the wall of the insulation element.

According to an advantageous embodiment of the invention, the outer side of the wall of the insulation element comprises at least one shaping which is developed such that in the circumferential direction it has the form of an indentation, in particular of a circumferential groove.

The at least one shaping within the wall of the insulation element is preferably disposed in a plane oriented perpendicularly to the longitudinal axis of the stator.

In the case of implementing at least two shapings within the wall of the insulation element, the shapings are preferably disposed spaced apart and in a plane oriented perpendicularly to the longitudinal axis of the stator.

According to a further preferred embodiment of the invention, the segments of the connection leads of the conductor wires are disposed such that they are in contact on the outer side of the wall of the insulation element as well as proceed at an orientation in the circumferential direction of the wall.

It is herein advantageous for one segment of a connection lead of a conductor wire to be completely integrated within a shaping developed in the wall of the insulation element. By complete integration is to be understood the disposition of the connection lead of the conductor wire in the shaping, in which the full diameter of the conductor wire is embedded in the shaping. The conductor wire does not project at any site from the shaping. The maximal diameter of the conductor wire is less than the depth of the shaping or corresponds to the depth of the shaping.

The cover element is preferably disposed such that its inner surface closes off every shaping developed in the wall of the insulation element.

The outer surface of the cover element is preferably oriented in the direction of a housing comprised of electrically conductive material.

The cover element is advantageously implemented of an electrically insulating material. Therewith the cover element disposed on the insulation element of the stator is provided, in particular, for ensuring the requisite insulation distance.

According to a further development of the invention, the cover element and the insulation element are connectable with one another under form closure.

On the inner surface of the cover element preferably at least one projecture is provided that can have the form of a rib.

A further advantage of the invention comprises that the projecture is disposed in a plane oriented perpendicularly to the longitudinal axis of the stator and is developed fully over the entire periphery.

According to an advantageous embodiment of the invention, the projecture projecting from the inner surface of the cover element and at least one shaping implemented on the outer side of the wall of the insulation element are developed corresponding to one another such that the projecture is disposed so as to snap into the shaping.

According to a further preferred embodiment of the invention, the cover element comprises, at an end side oriented toward the stator, a section of a widening with a greater diameter, at least of the inner surface, than a section in contact on the wall of the insulation element. A transition from the section of the widening to the section with the lesser diameter of the cover element is implemented conically.

Furthermore, on an end side, oriented in the axial direction distally to the end side with the cover element, of the stator a support member with at least one receiving member for at least one plug housing can be disposed.

The problem is also resolved through a method according to the invention for assembling the device, in particular an electric motor, for driving a compressor of a gaseous fluid. The method comprises the following steps:

disposing a rotor and a stator on a common longitudinal axis, wherein the stator encompasses the rotor in the radial direction, disposing a cover element at an end side, oriented in an axial direction of a cylindrical wall of an insulation element of the stator, such that an inner surface of the cover element is in contact on an outer side of the wall of the insulation element, as well as sliding the wall of the insulation element into the cover element in the axial direction until a projecture, developed on the inner surface of the cover element, snaps into a shaping developed on the outer side of the wall of the insulation element.

According to a further development of the invention, the cover element is disposed with an end side with a section of a widening with greater diameter, at least of the inner surface in comparison to the remaining cover element, in the direction of the end side of the cylindrical wall of the insulation element. During the process of sliding the wall of the insulation element into the cover element, the cover element is centered on the wall of the insulation element due to the development of a conical transition of the inner surface of the cover element from the section of the widening to the section with lesser diameter.

A special advantage of the invention, moreover, comprises that the cover element does not have a fixed angular position to the stator core and to the insulation element, which enables simple assembly.

The advantageous embodiment of the invention enables the use of the device, in particular an electric motor, for the compression of a gaseous fluid for a compressor of a refrigerant in a refrigerant circuit of a motor vehicle climate control system.

In summary, the device according to the invention for driving a compressor of a gaseous fluid with a minimal number of required components and the method for assembling the device comprises further diverse advantages:

- simple assembly as well as simple fixing of the cover element in position on the insulation element of the stator core, therein best possible electrical insulation of the connection leads of the conductor wires,
- augmentation of the insulation resistance and reduction of the space requirement depending on voltage level, since, for example, no separate potting for the insulation is necessary which additionally shortens the curing time during the assembly,
- avoidance of the occurrence of short-circuit currents between the conductor wires as well as further electrically conductive, inactive components by ensuring necessary insulation distances depending on voltage level,
- reduction during the production of the number of rejects due to too weak an insulation resistance and therewith generating minimal cost as well as
- maximizing the service life of the compressor.

With a simple assembly step of the cover element, in particular magnetically inactive connections between the coils, or conductor wires, in particular connection leads of the conductor wires, specifically connecting lines, are completely covered in order to increase the insulation distance and therewith increase the insulation resistance. Simultaneously, the end side, oriented toward the housing of the motor, of the stator is mechanically reinforced which has an advantageous effect on the process of squeezing the stator into the housing.

Further details, characteristics and advantages of embodiments of the invention will become evident based on the following description of embodiment examples with reference to the associated drawing.

BRIEF DESCRIPTION OF THE FIGURES

FIG. 1: a stator of an electric motor as a device for driving a compressor of a gaseous fluid, with a stator core, coils, and insulation element, a support member disposed on a first end side, as well as a cover element disposed on a second end side, in a perspective view, FIGS. 2A and 2B: each depicting the stator with a cover element disposed on a second end side, in a perspective view.

DETAILED DESCRIPTION

Figure 3A:
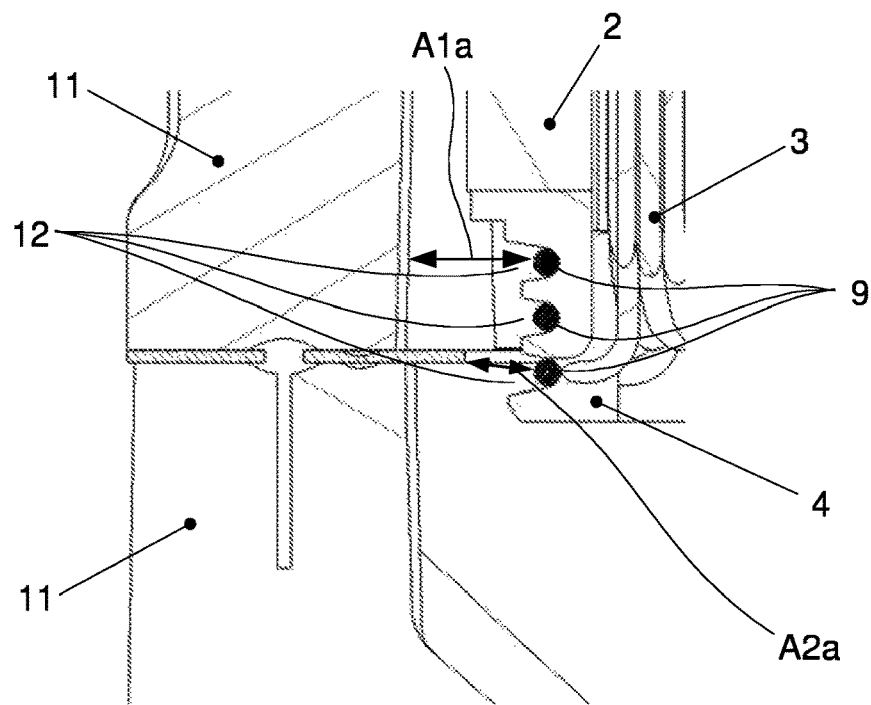
FIGS. 3A and 3B: each showing a detail view of the second end side of the stator disposed in a housing, with and without the cover element, in sectional representation.

FIG. 1 shows in perspective view a stator 1 of an electric motor as a device for driving a compressor of a gaseous fluid, specifically for a climate control system of a motor vehicle, for conveying refrigerant through a refrigerant circuit. The stator 1 is implemented with a stator core 2, coils 3, an insulation element 4, a support member 6 as well as a cover element 10.

The electric motor, for example a three-phase alternating current motor, comprises a not shown rotor and the stator core 2 disposed in the radial direction on an outer side of the rotor and thus about the rotor. The stator core 2, preferably implemented as a laminated sheet package, and the insulation element 4, developed of an electrically insulating material, extend each along a longitudinal axis 5, which also corresponds to the longitudinal axis of the stator 1 and to the rotational axis of the rotor, from a first end side 7 to a second end side 8 of the stator 1. The insulation element 4 is advantageously implemented as a coating of the stator core 2 and thus forms an integral component.

The coils 3 are each implemented of a wire, wound about the radially inwardly extending region of stator core 2, as electrical conductor, also termed conductor wire 9. All of the conductor wires 9 are developed of lacquered copper wire.

The non-wound ends of the conductor wires 9 are brought out of the particular winding as connection leads or magnetically inactive segments. Connection leads serving as coupler lines for connecting and joining coils 3 of same phase, as a first portion of the connection leads similar to the conductor wires 9 are developed in the proximity of the coils 3 exclusively lacquer-insulated, while a second portion of the connection leads, configured for electrically connecting to connections of the electric motor, is additionally preferably insulated with a sheathing of a synthetic material.

The regions of stator core 2, extending in the radial direction inwardly, have each the form of a web and are uniformly distributed over the circumference of an outer wall of stator core 2. Between the conductor wires 9 of coils 3 and the particular regions of the stator core 2 the insulation element 4 is disposed which electrically insulates the stator core 2 and the conductor wires 9 of coils 3 with respect to one another. The insulation element 4 is in each instance developed on the ends, oriented inwardly and in the axial direction, of the webs so as to widen in the axial direction. The end sections of the insulation element 4 protruding in such manner serve for fixing the conductor wires 9, wound about the webs of stator core 2, of the coils 3.

The stator core 2, the insulation element 4 and the coils 3 form the stator unit of the electric motor.

At the end sides 7, 8 of stator 1 the insulation element 4 projects beyond the stator core 2. On the first end side 7 of stator 1 is disposed the support member 6 with a receiving member with connection passages for a plug housing 99 with connecting ports. The connecting ports of the plug housing 99 serve as a component of an electrical connection between the coils 3 of the electric motor and the inverter, for example with the aid of electrically conducting, pin-shaped plug connectors which, guided through the connection passages of the receiving member of the support member 6, are plugged into the connecting ports of the plug housing 99.

The connection leads of the conductor wires 9 of coils 3 and the connecting ports of the plug housing 99 disposed in the receiving member are electrically connected with one another.

In the mounted state of the stator 1 the support member 6 is in contact in the axial direction on stator 1, in particular on stator core 2. The outer diameter of the support member 6 is herein less than the outer diameter of stator core 2. The receiving member for the plug housing 99 is a constituent of support member 6 such that the support member 6 and the receiving member are developed as a unit, in particular as a unitary injection molded part. The unitary implementation is realized within an injection molding process.

On the second end side 8, developed distally to the first end side 7, of stator 1 is disposed an annular cover element 10 which, in the mounted state of stator 1, is fully in contact in the axial direction on stator 1, in particular on the insulation element 4. The cover element 10 is implemented as an axially oriented, cylindrical, in particular hollow cylindrical, specifically hollow circular cylindrical, and closed annulus. The hollow cylindrical wall of the axially oriented annulus of the cover element 10 is developed with an outer diameter that is less than the outer diameter of the outer wall of the stator core 2 and with an inner diameter that is greater than the inner diameter of the outer wall of stator core 2.

In FIGS. 2A and 2B is depicted in a perspective view the stator 1 with the cover element 10, disposed on the second end side 8, preferably implemented as an injection molded part of an insulation material. In FIG. 2a the stator 1 is shown during the process of assembly and thus with the cover element 10 removed, wherein in FIG. 2b the stator 1 is shown with the mounted cover element 10.

The cover element 10 is emplaced at the second end side 8 of the insulated stator 1, in particular on the insulation element 4 projecting from the stator core 2, and fixed in position. The cover element 10 is snapped in, or clicked in, on the insulation element 4.

With the cover element 10 in particular the segments developed between the coils 3 of the non-wound lacquer-insulated conductor wires 9, brought out of the particular windings or introduced into the particular windings, of the lacquer-insulated conductor wires 9 as s first portion of the connection leads are covered toward the surrounding of stator 1. In an alternative, not depicted, embodiment, in addition, the segments of the conductor wires 9, brought out of the particular windings as well as segments of the conductor wires 9, developed as a connection to the plug housing 99 and thus to the inverter, can, as a second portion of the connection leads, be disposed in such manner as to be insulated by a cover element against the surrounding.

The magnetically inactive segments of the conductor wires 9, coursing between the windings of coils 3 or developed as a connection to the plug housing 99, at an end, oriented to an end side 7, 8, of insulation element 4, are in contact on the insulation element 4 and are oriented in the circumferential direction of stator 1. The segments of the conductor wires coursing between the windings of coils 3, are each disposed such that they are protected in the radial direction in each instance between the insulation element 4 and the cover element 10.

With the annular cover element 10 the insulation distances to the other electrically conductive components, such as the housing of the motor, or the required insulation resistances, are ensured especially with an increased creepage path depending on the voltage level, for example, to the housing of the motor.

Figure 3B:
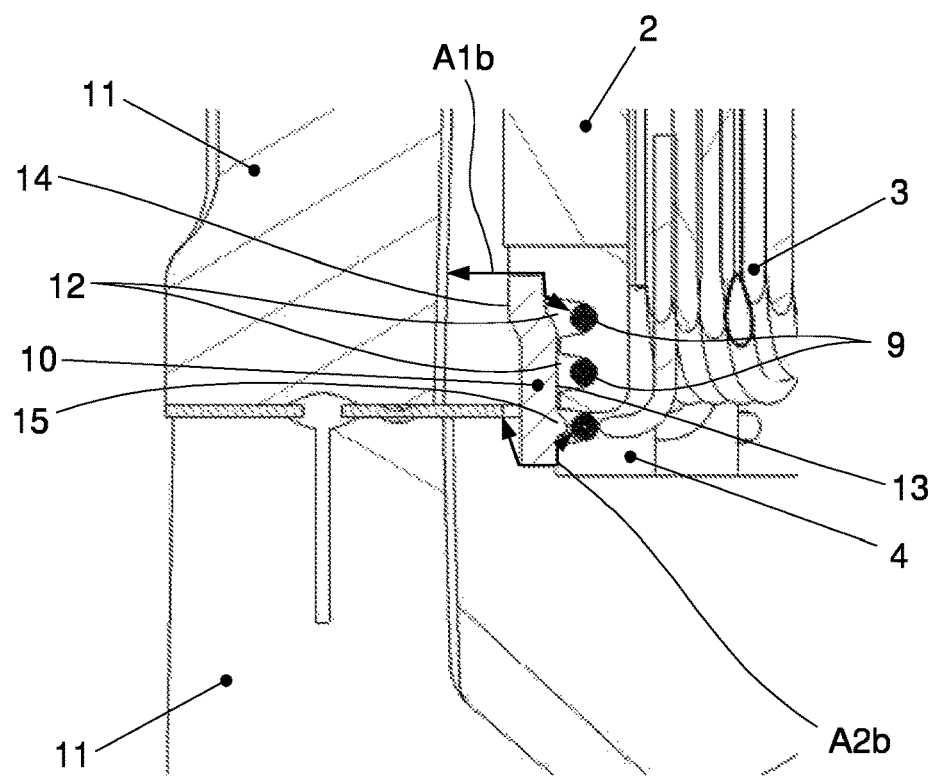

In FIGS. 3A and 3B are shown detail views of the second end side 8 of the stator 1 disposed in a housing 11 of the motor in a sectional representation. In FIG. 3a the stator 1 without the additional cover element 10 is shown, while in FIG. 3b the stator with the mounted cover element 10 is depicted.

The insulation element 4, preferably developed as a coating of the stator core 2, with an outer lateral surface in the radial direction is in contact inside on the outer wall of stator core 2. The wall of the insulation element 4 herein projects at the end sides 7, 8 of stator 1 in the axial direction beyond the stator core 2. The magnetically active segments of the conductor wires 9, wound into coils 3, are disposed about regions, extending inwardly in the radial direction, of the insulation element 4 which subsequently is disposed between stator core 2 and the conductor wire 9 of coils 3.

The magnetically inactive and unwound segments of the conductor wires 9, running as connection leads between the windings of coils 3, are fully integrated circumferentially at the region of the insulation element 4 projecting beyond the stator core 2 in the circumferential direction as well as into shapings 12 developed as grooves. In addition, the magnetically inactive segments of the conductor wires 9, or the connection leads, extending to an electrically connected neutral point of the phases, can also be disposed within such shapings 12, also termed receiving regions. The shapings 12 are each developed in a plane that is oriented perpendicularly to the axial direction of the stator 1.

Depending on the voltage level of the motor, between the conductor wires 9 and other electrically conductive metal components of the motor, such as the housing 11 or components of the compressor, distances conforming to standard, also termed insulation distances $A1a$, $A1b$, $A2a$, $A2b$, must be observed in order to avoid, for example, short circuits or flashovers between the conductor wires 9 and electrically conductive components disposed adjacently thereto.

By providing the cover element 10, the first insulation distances $A1a$, $A2a$, as insulation distances without cover element 10, are extended with the cover element 10 to the insulation distances $A1b$, $A2b$ as insulation distances and the risk of short circuit occurrences or flashovers is reduced.

The increase of the second insulation distances $A1b$, $A2b$ in comparison to the first insulation distances $A1a$, $A1b$ by disposing the cover element 10 are evident based on a comparison of FIGS. 3a and 3b. Herein is evident: $A1b > A1a$ and $A2b > A2a$. The first insulation distances $A1a$, $A2a$ of the disposition of the stator 1 within housing 11 according to FIG. 3a correspond to the shortest connection between the particular conductor wire 9 and the directly adjacent components of housing 11. Due to the disposition of the cover element 10 on the insulation element 4, the second insulation distances $A1b$, $A2b$ extend about the cover element 10, in particular on the wall and each along at an end side of the cover element 10. Due to the development of the cover element 10, the first insulation distances $A1a$, $A2a$ as the shortest connection between the conductor wires 9 and the housing 11 according to FIG. 3a are consequently increased to the second insulation distances $A1b$, $A2b$ according to FIG. 3b.

The insulation element 4 projects beyond the stator core 2 at the second end side 8 of stator 1. The region projecting from the stator core 2 of the insulation element 4 comprises a wall substantially in the form of a hollow circular cylinder which is disposed in the axial direction. As is in particular shown in FIG. 3b, the cover element 10, also substantially of hollow circular cylindrical form, is disposed with an inner surface 13 of the axially oriented annulus on a lateral surface of the wall of the region of the insulation element 4 projecting from the stator core 2. The outer diameter of the wall of the insulation element 4 corresponds herein to the diameter of the inner surface 13 of the cover element 10 plus a clearance, or a gap, for mounting the cover element 10 on the insulation element 4. An outer surface 14 of the cover element 10 is oriented in the direction toward the housing 11.

The annular cover element 10 is disposed with the inner surface 13 so as to close off or cover the receiving regions 12, developed circumferentially in the circumferential direction on the wall of the region of the insulation element 4, projecting from the stator core 2, as well as implemented as grooves into which the conductor wires 9 are integrated. Since the cover element 10 as well as the insulation element 4 are electrically insulating components, the receiving regions 12, provided in the insulation element 4 and closed by the cover element 10, implemented as shapings, the conductor wires 9, provided in the insulation element 4 and closed by the cover element 10, are fully enclosed over their entire circumference by an electrical insulation.

The annular cover element 10 comprises a projecture 15 developed on the inner surface 13 as a circumferential rib. The projecture 15 is herein disposed, preferably over the full periphery, in a plane oriented perpendicularly to the axial direction of stator 1. The groove-like shapings 12 provided on the insulation element 4 for receiving a conductor wire 9 as well as the projecture 15 disposed on the cover element 10 are thus in each instance disposed in a plane oriented perpendicularly to the axial direction of stator 1. In the mounted state of the cover element 10 on the insulation element 4 the projecture 15 and one of the shapings 12 correspond to one another such that the projecture 15 is disposed snapped-in as well as oriented in the direction of a conductor wire 9. The projecture 15 engages into one of the shapings 12 such that the cover element 10 and the insulation element 4 are firmly and tightly connected with one another, wherein the connection could only be released through commensurate relative movement of cover element 10 and insulation element 4 with respect to one another, for example by rotating and pulling. After the electric motor, or the compressor, has been mounted and specifically during its operation, the autonomous release of the connection of cover element 10 and insulation element 4 is not possible.

For the simplified mounting of the cover element 10 on the insulation element 4 of stator 1, the annular cover element 10 comprises on an end side, oriented toward the insulation, a widening. In the proximity of the widening the inner surface 13 as well as also the outer surface 14 are developed with a greater diameter than in the remaining region. The transition from the region of the widening to the region with lesser diameter is continuous, in particular conical. During the mounting of the stator 1 the cover element 10 is slid, with the end side including the widening first, onto the insulation element 4.

In the process of mounting the compressor, in particular of the electric motor, specifically of the stator 1, the cover element 10, with an end side of lesser diameter of the inner surface 13, can be placed onto a mounting support such that the region of widening, and thus the end side with the greater diameter as the free end, is preferably disposed upward in the vertical direction from below the stator core. By emplacing the stator 1 with the region of the insulation element 4 projecting in the circumferential direction on the wall of the stator 1, the insulation element 4 is slid under low pressure into the cover element 10. Due to the conical implementation of the inner surface 13 of the cover element 10, the cover element 10 is centered on the insulation element 4. During the mounting, the cover element 10 and the insulation element 4 are moved in the axial direction relative to one another until the projecture 15 provided on the inner surface 13 of the cover element 10 snaps into a shaping 12 developed on the lateral surface of the wall of the region of the insulation element 4 projecting from the stator core 2. With the snapping-in of the projecture 15, also termed fixing element, the cover element 10 is solidly and firmly connected with the insulation element 4 such that, in particular during normal operation, the force-free separation of the components, for example through detachment due to vibrations, is not possible. During the mounting of the cover element 10 emplaced on the mounting structure, the stator 1 with the insulation element 4 is slid in the vertical direction from above downwardly into the cover element 10. Since the annular cover element 10 in the tangential direction does not require a precisely defined orientation or position, it is not necessary for the mounting to take place at a defined angle. The cover element 10 can be fixed on the insulation element 4 without predetermined angular position with respect to the stator core 2 and the insulation element 4.

In addition to increasing the insulation resistance within the compressor driven by the electric motor, the disposition of the cover element 10 on the stator 1 of the motor on the side of the compressor oriented toward the compression mechanism effects an additional mechanical reinforcement of the delimitation of the stator 1 for the process of squeezing the motor into the housing 11. With the cover element 10 in particular the side of the stator 1 is reinforced that serves as constraint during the process of shrinking/squeezing.

LIST OF REFERENCE NUMBERS

1 Stator
2 Stator core
3 Coil
4 Insulation element
5 Longitudinal axis
6 Support member
7 First end side
8 Second end side
9 Conductor wire
10 Cover element
11 Housing
12 Shaping, receiving region
13 Inner surface
14 Outer surface
15 Projecture
A1$a$, A2$a$ First insulation distance
A1$b$, A2$b$ Second insulation distance

What is claimed:

1. A device for driving a compressor of a gaseous fluid comprising a rotor and a stator disposed along a common longitudinal axis, wherein the stator comprises connection leads developed as segments of conductor wires of coils, wherein in a region of at least one end side, oriented in the axial direction, of the stator a cover element is disposed developed in the form of an axially oriented hollow cylinder with an inner surface and an outer surface, wherein the cover element with the inner surface is in contact on an insulation element disposed on the stator and having a cylindrical wall and at least segments of the connection leads of the conductor wires are disposed between an outer side of the wall of the insulation element and the inner surface of the cover element, wherein the cover element at an end side oriented toward the stator comprises a section of a widening with a greater diameter of at least the inner surface than a section in contact on the wall of the insulation element, wherein a transition from the section of the widening to the section with lesser diameter of the cover element is developed conically.

2. A device as in claim 1, wherein the cover element has the form of a hollow circular cylinder.

3. A device as in claim 1, wherein the insulation element is disposed such that it is in contact in the radial direction inside on an outer wall of a stator core, wherein the cylindrical wall of the insulation element is developed as a region projecting from the stator core in the direction of the longitudinal axis.

4. A device according to claim 1, wherein the insulation element is fixedly connected with the stator.

5. A device according to claim 1, wherein the wall of the insulation element is developed in the form of a hollow cylinder.

6. A device according to claim 1, wherein the cover element is fully in contact over its circumference on the outside of the cylindrical wall of the insulation element, wherein a diameter of the inner surface of the cover element corresponds to the diameter of the wall of the insulation element.

7. A device according to claim 1, wherein the outer side of the wall of the insulation element comprises at least one shaping developed circumferentially in the circumferential direction and as an indentation.

8. A device as in claim 7, wherein the at least one shaping is disposed in a plane oriented perpendicularly to the longitudinal axis of the stator.

9. A device according to claim 7, wherein with the implementation of at least two shapings, the shapings are each disposed spaced apart from one another and in a plane oriented perpendicularly to the longitudinal axis of stator.

10. A device according to claim 7, wherein in each instance a segment of a connection lead of a conductor wire is disposed such that it is completely integrated within a shaping.

11. A device according to claim 7, wherein the cover element is disposed such that its inner surface closes each shaping.

12. A device according to claim 1, wherein the segments of the connection leads of the conductor wires are disposed such that they are in contact on the outer side of the wall of the insulation element and such that they extent with an orientation in the circumferential direction of the wall.

13. A device according to claim 1, wherein the outer surface of the cover element is oriented in the direction of a housing comprised of an electrically conductive material.

14. A device according to claim 1, wherein the cover element is developed of an electrically insulating material.

15. A device according to claim 1, wherein the cover element and the insulation element are developed such that they are connectable with one another under form closure.

16. A device according to claim 1, wherein on the inner surface of the cover element at least one projecture is developed.

17. A device as in claim 16, wherein the projecture has the form of a rib.

18. A device as in claim 16, wherein the projecture is disposed such that it is oriented in a plane oriented perpendicularly to the longitudinal axis of the stator.

19. A device according to claim 16, wherein the projecture and at least one shaping developed on the outer side of the wall of the insulation element are developed correspondingly to one another such that the projecture is disposed snapped into the shaping.

20. A device according to claim 1, wherein on an end side, oriented in the axial direction distally to the end side with the cover element, of stator a support member with at least one receiving member for at least one plug housing is disposed.

21. A method for assembling the device for driving a compressor of a gaseous fluid according to claim 1, comprising the following steps:
    disposing a rotor and a stator on a common longitudinal axis, wherein the stator encompasses the rotor in the radial direction,
    disposing a cover element on an end side, oriented in an axial direction, of a cylindrical wall of an insulation element of the stator such that an inner surface of the cover element is in contact on an outer side of the wall of the insulation element as well as
    sliding the wall of the insulation element into the cover element in the axial direction until a projecture developed on the inner surface of the cover element snaps into a shaping developed on the outer side of the wall of the insulation element.

22. A method as in claim 21, herein the cover element is being disposed with an end side with a section of a widening with a greater diameter of at least the inner surface in the direction of the end side of the cylindrical wall of the insulation element and during the process of sliding the wall of the insulation element into the cover element, due to the formation of a conical transition of the inner surface of the cover element from a section of the widening to the section with lesser diameter, the cover element is centered on the wall of the insulation element.

23. A method for compression of a gaseous fluid by compressing the gaseous fluid with a device according to claim 1, wherein the gaseous fluid is a refrigerant in a refrigerant circuit of a climate control system of a motor vehicle.

* * * * *